(No Model.) 3 Sheets—Sheet 1.

F. H. D. SCHWARZ.
PHOTOGRAPHIC MAGAZINE CAMERA.

No. 425,005. Patented Apr. 8, 1890.

Attest:
E. Arthur
W. E. Shright

Inventor:
Frank H. D. Schwarz.
By Knight Bro's
Att'ys.

THE NORRIS PETERS CO., PHOTO-LITHO., WASHINGTON, D. C.

(No Model.) 3 Sheets—Sheet 2.
F. H. D. SCHWARZ.
PHOTOGRAPHIC MAGAZINE CAMERA.
No. 425,005. Patented Apr. 8, 1890.
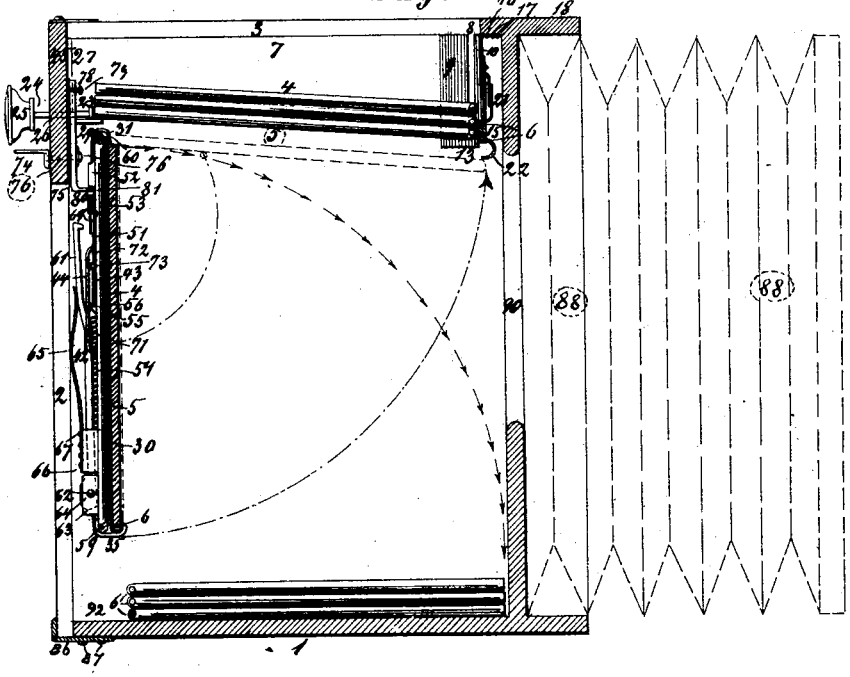
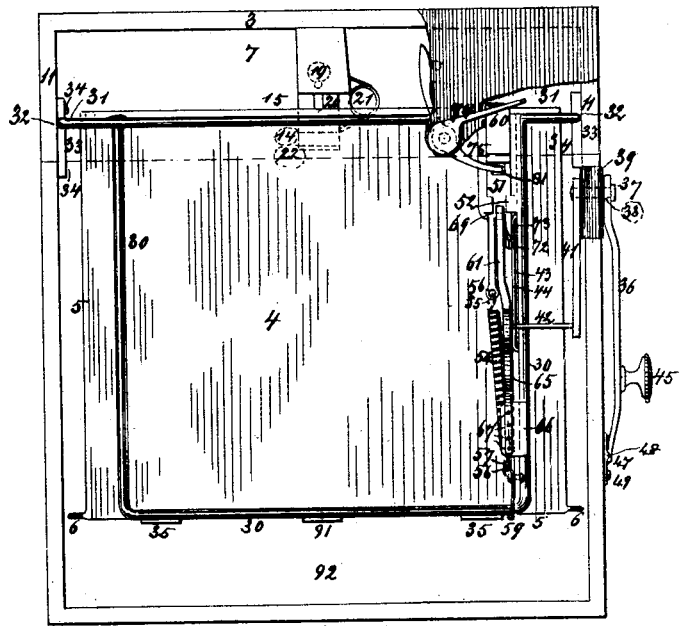

(No Model.) 3 Sheets—Sheet 3.

F. H. D. SCHWARZ.
PHOTOGRAPHIC MAGAZINE CAMERA.

No. 425,005. Patented Apr. 8, 1890.

Attest:
E. Arthur
W. C. Knight

Inventor:
Frank H. D. Schwarz.
By Knight Bros.
Atty's.

UNITED STATES PATENT OFFICE.

FRANK H. D. SCHWARZ, OF ST. LOUIS, MISSOURI.

PHOTOGRAPHIC MAGAZINE CAMERA.

SPECIFICATION forming part of Letters Patent No. 425,005, dated April 8, 1890.

Application filed August 13, 1889. Serial No. 320,615. (No model.)

*To all whom it may concern:*

Be it known that I, FRANK H. D. SCHWARZ, of the city of St. Louis, in the State of Missouri, have invented a certain new and useful Improvement in Photographic Magazine Cameras, of which the following is a full, clear, and exact description, reference being had to the accompanying drawings, forming part of this specification.

This invention relates to devices for operating a multiple of plates or films in a magazine photographic camera; and the invention consists in features of novelty hereinafter fully described, and pointed out in the claims.

Figure 1:
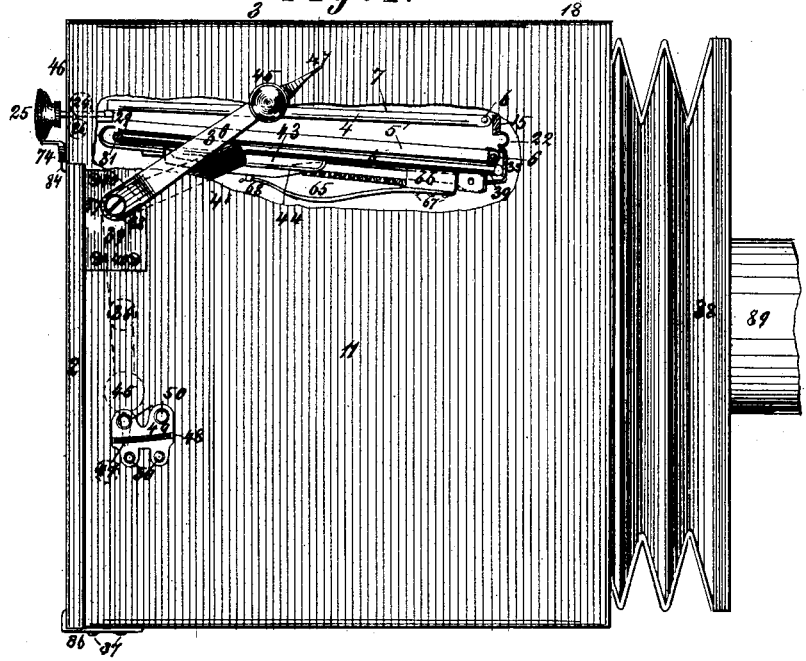
Figure 2:
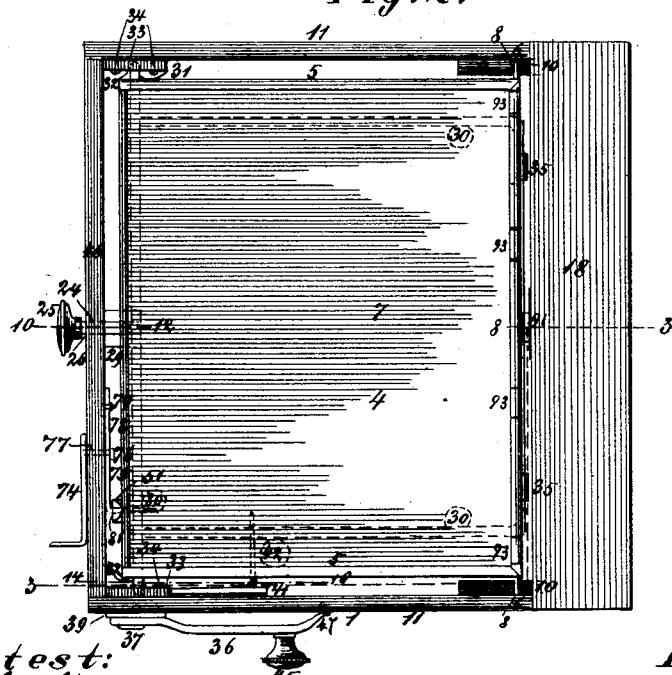
Figure 5:
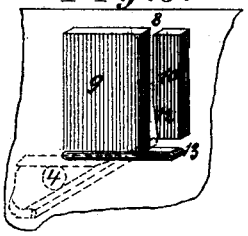
Figure 6:
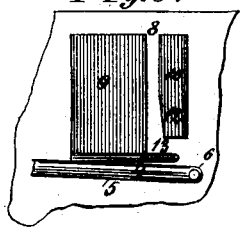
Figure 7:
Figure 8:
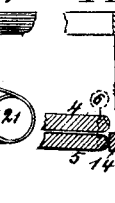
Figure 9:
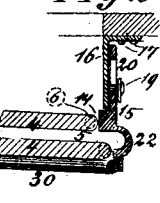
Figure 10:
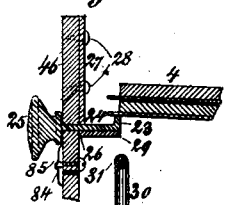
Figure 11:
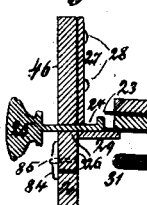
Figure 12:
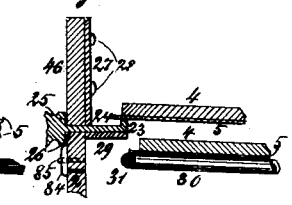
Figure 13:
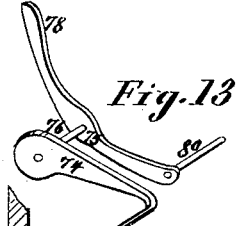
Figure 14:
Figure 17:
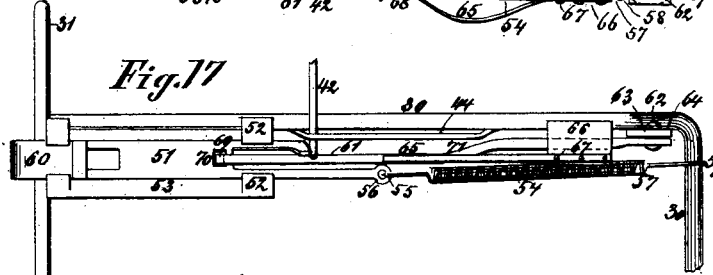
Figure 16:
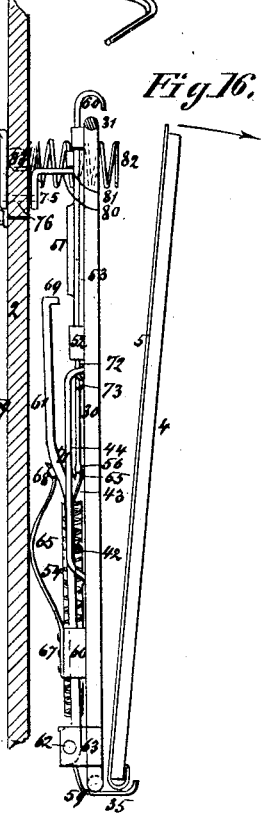
Figures 15, 18:
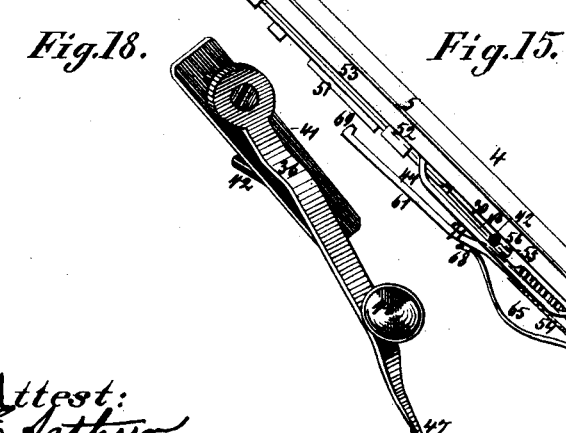

Figure 1 is a side elevation, part broken away, and shows the lever that lifts the negative-plate-carrier frame in its elevated position immediately after being the recipient of a plate and ready to drop into position for taking the negative. Fig. 2 is a plan top view of the camera with the cover removed, and shows the plates in position in the magazine. Fig. 3 is a vertical longitudinal staggered section taken on line 3 3, Fig. 2, and shows the plate-carrier frame with the sensitive plate it carries ready for operation, a series of plates in the magazine above ready to be dropped into position, and a series of negatives that have been automatically deposited below after the view has been taken. Fig. 4 is a rear elevation with the rear casing and shutter mostly broken away to show the plate-holder and its actuating devices in their operative position. Fig. 5 is an enlarged perspective view of the plate-rest that holds the pivot-supporting pins of the casings which inclose the plates while said plates are in the magazine, with plate shown in broken lines. Fig. 6 is an enlarged elevation of plate-rest, and shows one plate with its journal-pin slid off the trackway of the rest and ready to swing into operative position. Fig. 7 is an enlarged elevation of the center latch, and shows the coil-spring that actuates said latch. Figs. 8 and 9 are enlarged vertical sections taken on line 8 9, Fig. 7, and show, respectively, the bottom plate of the series in the magazine tripped off its center latch in Fig. 8 and onto its carrier-frame in Fig. 9. Figs. 10, 11, and 12 are enlarged vertical sections taken on line 10 12, Fig. 2, and show the operations of the push tripping-button. Fig. 13 is an enlarged perspective view of the double lever that disengages the clutch-hook to release the captive plate after the negative is taken. Figs. 14, 15, and 16 are enlarged detail vertical sections taken on line 14 16, Fig. 2, and show different positions of the plate-carrier frame during its manipulation and the automatic operation of the spring clamping-dog. Fig. 17 is an enlarged detail rear elevation of plate-frame when elevated to the horizontal position, as in Fig. 14, which Fig. 14 shows said parts in elevation. Fig. 18 is an enlarged perspective view of the operating-lever.

Referring to the drawings, 1 represents the case of the camera, 2 the rear shutter thereto, and 3 the cover.

The sensitive plates 4, on which the negatives are taken, are preferably of glass, but may be of film, and are inclosed in individual casing-frames 5, of metal, rubber, or other suitable material, to which are secured, by any suitable means, the projecting metal supporting-pins 6. The said casing-frames, with the plates they inclose, are placed in a surmounting series in the magazine depository 7 in the top of the camera-frame, the supporting-pins 6 of said frames being seated in and passing down through the slots or guideways 8 between the major vertical brackets 9 and the parallel minor brackets 10, which brackets are securely fastened to the inside pieces 11 of the camera-case. The lower inside edge of the minor brackets are beveled longitudinally at 12, so as to facilitate the out-passage of the supporting-pins of the plate-frames, and are foreshortened at bottom, so as to leave a sufficient space for the passage of said supporting-pins as they are slid on the projecting ends of the rest guide-bars 13, and the fast ends of said guide-bars are secured to the bottom of the major brackets 9. The forward edges of said plate-frames, besides being supported by said rests, lie against the inwardly-projecting flange 14 of the spring-actuated pendent center latch 15. A stationary pendent bracket 16 is secured by screws or rivets 17 to the lower side of the stationary top piece 18, that closes in at top the forward part of the camera-case, the residue of the top of which is inclosed by the removable cover 3. A headed rivet or screw-bolt 19 projects from the forward side of the stationary pendent bracket 16 and engages in the elongated slot 20 in the spring-actuated pendent latch 15, the head of said bolt or rivet holding said latch 15 in engagement with said brackets 16, and the elongated slot providing the means for the vertical working of said pendent latch under the impulse of the coil-spring 21, which is fast secured to the stationary pendent bracket 16 above, and pushes down on the curved buffer-stay 22 at the foot of said latch, so as to spring the vertically-sliding pendent latch back to its normal position after its elevation for the release of the casing that incloses the sensitive plate, which is then on its way toward its operative position to receive the impression of its negative.

The rear side of the pile or series of sensitive plates in the surmounting magazine-chamber of the camera are supported on the upwardly-projecting flange 23 of the sliding trip-bar 24 of the push-button 25 until said flanged bar is drawn out through its slotted seat 26 in the bracket 27, which bracket is secured to the inside of the lintel 46 (that surmounts the rear shutter) by the screws 28. When said button is drawn out, the rear side of the pile of sensitive plates and their frames drop down off the upwardly-turned flange 23 of the sliding trip-bar 24 and rest on the angle-flange 29 at the foot of said bracket 27.

30 represents the metal-plate-carrier frame, whose axle-journal rod 31 has its journal-bearings in the brackets 33, that are secured by screws 34 to the insides of the side pieces 11 of the camera-frame immediately below the magazine-depository 7, that surmounts the camera proper. Curve flanged metal rests 35 are soldered to and project from said plate-carrier frame and hold the foot of the frame 5, that incloses the sensitized plates, while the negative is taking. When said frame is in its normal position, or that in which the sensitive plate 4, (inclosed in the metal frame 5,) which it carries, is in position to take the impression of the negative, the said plate-carrier frame 30 hangs vertically pendent from the axle-journal rod 31 in its bearings 32, being adjusted to said position by the operating-lever 36. The said operating-lever works outside of one of the side pieces 11 of the camera-casing and works on a journal-screw 37 in bearings 38 in the journal-bearing plate 39, that is secured to the outside of said side piece by the screws 40. The said journal-bearing screw is tight-seated in the operating-lever, has loose bearings in the journal-bearing plate in which it works, and its inner end is tight-seated in the simultaneously-working coadjutary lever 41, whose movement is inside the camera-casing. A projecting pin 42, secured to the loose end of said coadjutary lever, engages in the elongated slotted guideway 43, formed by the parallel bracket-bar 44, in conjunction with the plate-carrier frame, the angle-flanged ends of which bar are soldered or otherwise secured to one of the side bars of the plate-carrier frame in close proximity to said coadjutary lever.

A thumb-knob 45, secured to near the lower end of the operating-lever 36, provides the means of manipulating said lever, and with its coadjutary lever by the pin 42, that works in the elongated slot 43, the plate-carrier frame 30 is adjustable to its vertical position, (shown in Figs. 3, 4, and 16,) to its horizontal position, (shown in Figs. 1, 2, 14, and 17,) or to its inclined position, as shown at an angle of forty-five degrees in Fig. 15.

When the plate-carrier frame is in its vertical or approximately vertical position for effecting the impression of the negative, the adjustment of the back-swing to suit the respective condition of the view is registered by the pointer 47 on the free end of the operating-lever, which points on the graduations 48 on the scale-plate 49, to indicate, respectively, the vertical or approximately vertical position of the carrier-frame and sensitive plate it carries. The said graduated scale-plate is secured by screws or rivets 50, as shown in Fig. 1, to the same side piece to which the operating-lever is attached.

51 represents a sliding gate that works within the flanged brackets 52 on the gangway-plate 53, that is soldered or otherwise secured to the upper corner of the plate-carrier frame that is adjacent to the operative and coadjutary levers. A spiral spring 54 is secured to said sliding gate by its clutch-hook 55, which engages in the eye-hole 56 at the attached terminal of said sliding gate, and the hook 57 at the other terminal of said spring engages with the hook 58, whose coadjutary quarter-turn hook 59 at the reverse end is engaged around the foot-bar of the plate-carrier frame. At the other terminal of said sliding gate, integral therewith and projecting therefrom, is the clutch-hook 60, which, while drawn downward with the sliding gate, with which it is integral, by the said spiral spring, clutches the top of the frame that incloses the sensitive plate, and with the same grip the top bar or journal-rod of said plate-carrier frame, so as to firmly lock said plate to said carrier-frame at top, while it is held at foot by the curvilinear flanged foot-rests 35, that project from the reverse end of said carrier-frame, until such time as the negative is taken.

61 represents a long pawl that is pivotally secured at its fast end by the pivot-bolt 62 to the projecting bearing-plate 63, that is soldered or otherwise secured to the side bar of the plate-carrier frame, near the foot or lower end of said frame, the pivot-bolts working in the perforate bearing 64 in said bearing-plate.

65 represents a reactionary strap-spring, the fast end of which is secured to an angle-bracket 66 by screws or rivets 67, the said angle-bracket being secured to one of the side bars of the plate-carrier frame not far from its foot or lower end by soldering or any other suitable means, and the loose end of said spring engages between the stay-lugs 68, that have an integral projection from the back of the long pawl 61, against which pawl said spring presses, so as to force the projecting catch-lug 69 into the locking-slot 70 in the sliding gate, except when said catch is out of registry with said slot and when the pressure of the spring is overcome by the extension terminal of the projecting pin 42, when it rides over the curvilinear bend 71 in the bar of the pawl as the plate-carrier frame descends, thus throwing the pawl out of engagement with the sliding gate 51, and allowing the spiral spring 54 to draw down said sliding gate, and with it its integral clutch-hook 60, that locks the sensitive plate and its casing-frame to the carrier-frame, before said carrier-frame attains its vertical position, in which position, were it not for the action of said locking clutch-hook, the plate might be disarranged on its seat or precipitated therefrom.

72 represents a forked projection or limb on the lower end of the sliding gate, against the terminal foot 73 of which the extension of the aforesaid pin 42 engages when the operating-lever has elevated the plate-carrier frame to near its horizontal position, so as to slide the gate and its locking clutch-hook out of the way of the reception of the sensitive plate that the frame is about to carry into position for the reception of its negative impression, the projecting catch-lug 69 of the long spring-pawl 61 then again springing to its seat in the locking-slot 70, so as to lock said locking clutch-hook in its open position.

74 represents the releasing-lever, which works outside the lintel 46 over the shutter at the rear of the camera, and is rigidly connected to the inside coadjutary releasing-lever 75 by the journal-pin 76, which pin is fast-seated in the coadjutary levers outside and in, so as to secure simultaneous action, but has loose bearings 77 in the lintel, through which it passes, so as to freely move within the limit circumscribed by the contact of its extensive upper stay-arm 78 (inside said lintel) with the buffer-pin 79, that projects from the inside of the lintel on the one hand and by the contact of the other end of said coadjutary lever or its latch-pin with the rear side of the locking clutch-hook 60.

The reverse end of the inside coadjutary lever to that which engages with the buffer-pin is provided with an inwardly-projecting latch-pin 80, that, when the plate-carrier frame has been dropped to near its vertical position, enters the slot 81 in the sliding gate 51, so as to elevate said sliding gate and the locking clutch-hook it carries, and thereby release the sensitive plate and the frame that incloses it when the impression of the negative has been effected thereon.

The spiral push-spring 82 is secured by the screw 83 to the inside of the rear shutter 2, and projects inwardly therefrom, so as to maintain an elastic pressure against the back of the sensitive plate when it is in its vertical position, and to throw the negative plate from the frame when the aforesaid releasing-lever has unlocked it from the carrier-frame after the taking of the negative, as shown in Fig. 16, just after having sprung the plate and effected the initial step of the throw, the plate seen in the initial stage of its radial descent, as indicated by the arrow.

A button 84 is secured by the screw 85, on which it works, to the lintel 46, adjacent to the top of the rear shutter 2, which said lintel surmounts. The said button fastens the said shutter in its closed position at top while the bottom of said shutter is held in position by the angle-flange brackets 86, which are secured to the bottom of the camera-case by the screws 87.

88 represents the usual bellows-frame for adjusting the focus of the lens, and 89 the tube in which said lens is housed, and 90 is the open port through which the focal view is taken.

The operation of the device is as follows: The cover 3 is removed from the top of the magazine 7, that surmounts the camera, and the sensitive plates 4 with the metal frames 5, in which they are incased, are deposited in said magazine. The supporting-pins 6, that project laterally from the said metal frames, are inserted in the slotted guideway 8, between the major and minor brackets 9 and 10, that are secured to the inside pieces of the camera and magazine frame near the front thereof, and the supporting-pins of the bottom casing-frame at the front corners thereof lie on the rest guide-bar 13, that is secured at its fast end to the foot of said major bracket, and the center of the front of said frame rests on the center adjustable latch 15, that hangs pendent with a spring adjustment from the pendent angle-bracket. The rear side of said sensitive-plate frame is deposited on the upwardly-projecting flange 23 of the sliding trip-bar 24, that is operated by the push-button 25. The bottom sensitive-plate frame with its inclosed plate being now securely seated in the magazine depository-chamber, any number required (only limited by the height of said chamber) of surmounting plates and their inclosing-frames may be laid in layers, the one above the other, and when all are deposited the cover 3 is placed in position and the magazine and camera are thereby closed in above. The operating-lever 36 on the outside of the camera-frame is next elevated from its vertical position shown in broken lines in Fig. 1 to the position shown in full lines in said figure. Simultaneously with the elevation of the said outside lever 36 its coadjutary inside lever 41 is also elevated with its projecting traveling pin 42, which sliding within the inclosed slotted guideway 43, the then empty sensitive-plate-carrier frame is elevated thereby from the normal vertical position shown in Figs. 3, 4, 10, and 16 into the horizontal or approximately horizontal position shown in Figs. 1, 2, 11, 12, 14, and 17. While the operating coadjutary levers are elevating their traveling pin 42, said pin slides out of interference with the pawl 61 and works into interference with the foot 73 of the fork-limb 72 of the sliding gate 51, thereby projecting said sliding gate forward, so as to unlock and throw the locking-hook 60 out of interference with the reception by the said elevated carrier-frame 30 of the sensitive-plate casing. At the same time the sliding of said gate by the pressure of the active traveler-pin on the foot of the pendent limb 72 of said gate has brought the lock-slot 70 therein to register with the locking catch-lug 69 on the forward operative end of the pawl 61, into which slot said catch-lug is impressed by the strap-spring 65, that presses against the back of said pawl, thereby locking the clutch-hook in its open position, which it maintains while the sensitive-plate-carrier frame is receiving its incased plate ready to transport it into position for the reception of its negative impression. When the sensitive-plate carrier has thus by said radial pivotal movement (enforced by the operating-levers and their traveling pin) been elevated into an approximate horizontal position, so that the tappet 91, that is soldered or otherwise secured to the front of the fore bar of the frame, contacts with the downwardly-projecting buffer-stay 22 of the pendent center latch 15, it drives said spring-latch upward to the extent allowed by the play of the pin or headed rivet 19 in the elongated slot 20 in said center latch, which elevation of the latch lifts the inwardly-projecting lug 14 of said latch from the front of the casing that incloses the lower sensitive plate. The push-button 25 and its sliding trip-bar are then drawn out until its upwardly-turned flange 23, on which the rear end of the casing of the lower sensitive plate rests, is withdrawn from under said casing, which allows it to drop onto the projecting flange 29 of the angle-bracket 27. The push-button 25 is then pushed inward, driving the bottom casing with its inclosed sensitive plate forward, and thus sliding its supporting-pins 6 off the rest guide-bars 13, so that said casing and its inclosed sensitive plate drops on the carrier-frame 30. The carrier-frame is then swung radially downward under the government of the said operating and coadjutary levers and their projecting traveler-pin 42 until having reached an angle of forty-five degrees (see Fig. 15) to that of the horizontal position in which it has received the plate, when the traveler-pin, which in the first part of said descent has left its contact with the foot 73 of the pendent limb 72 of the sliding gate, now running over the curvature of the pawl 61, forces it from its locking-seat in the sliding gate, and said gate is immediately drawn downward by the spiral spring 54, thus bringing the locking clutch-hook (which is integral with said sliding gate) into its locking position, in which it securely holds the upper end of the casing and the sensitive plate it contains to the carrier-frame. The frame with the casing and sensitive plate it carries is then turned by the levers to its vertical or approximately vertical position, as the case may be, according to the position of the object of which there is to be taken a negative impression, the pointer 47 on the operating-lever 36 as it passes over the graduations 48 on the scale-plate 49 aiding the operator in said placement by the indication of the position of the plate in the camera in the operation of the back-swing. In the meantime the inwardly-projecting pin 80, secured to the coadjutary lever 75, which is rigidly connected with the releasing-lever 74, has entered the slot 81 in the sliding gate 51 for shortly ensuing future service. The sensitive plate being now in position, the lens being also focused, the negative impression is taken. The releasing-lever 74 and its coadjutary lever are then elevated, thereby raising the sliding gate with which they are in communication, and with it the locking clutch-hook 60, when, the sensitive plate, now impressed with the negative, being thus released, the spiral spring secured to the inside of the shutter projects the plate with its incased frame from the carrier-frame, and it is deposited in the negative-plate-depository well 92. The camera, which may, if desired, be pivoted to its supporting-pedestal, is then turned in line with the next object whose negative is to be taken, and the carrier-frame is again elevated and the next succeeding plate from the pile within the magazine-chamber is deposited in said frame, which is then brought into focal position, the negative taken, and it also deposited in the negative-depository chamber, as described above, and so on until the whole of the sensitive plates in the magazine have received their negative impressions.

Any number required of incased sensitive plates may be stored in the surmounting magazine, and after printing be dropped into the depository-chamber in which the negative plates are laid and stored, the said surmounting magazine above and depository-chamber beneath being constructed with vertical capacity to hold the required number of plates.

It is evident, as shown and described, with a camera of the above-described construction and pivoted on its tripod, that if the objects to be negatived are posed or grouped around the studio it would be but the work of a few minutes to take a dozen or score of negatives, as the case may be, according to the number of sensitive plates that the magazine is constructed to hold.

The casings 5, that inclose the sensitive plates, may be of metal when the plates are small, and in consequence in little or no danger of injury when depositing in the magazine depository-chamber; but I prefer to make them of rubber or other suitable elastic material when they incase large plates. The metal supporting pins or rods 6, secured to said casings, which, when the casings are of metal, would preferably be soldered thereto, may be secured to the casings when of rubber or other elastic material by metal clips 93, that project from said supporting pins or rods and embrace the forward end of the casing.

I claim as my invention—

1. In a magazine photographic camera, the combination of the case that incloses the camera, the magazine in the upper portion of said chamber, the multiple of sensitive plates deposited in said magazine, and the buffer-casing 5, with its supporting-pins 6 of said sensitive plates, that prevents the contacting of said plates together and relieves the concussion incident to their transplacement, substantially as and for the purpose set forth.

2. In a magazine photographic camera, the combination of the outer case of said camera and magazine, the major bracket 9 and the minor brackets 10, which brackets are secured to the inside of said case, and the rest guide-bar 13, secured to the foot of said major bracket, between which brackets and rest are provided the guide-slots 8, through which the supporting-pins 6 of the plate-frames move as the sensitive plates in said frames individually travel into position for taking the impression of the negative, substantially as and for the purpose set forth.

3. In a magazine photographic camera, the combination of the camera-case having a magazine depository at the top thereof for receiving the sensitive plates, rest guide-bar 13, that supports the front ends of the sensitive plates and their casing while the latter are in horizontal position, the trip-bar 24, with its upwardly-projecting flange 23, that supports the rear ends of said sensitive plates while the latter are in horizontal position and until they are individually tripped, and the push-button 25, that actuates said trip-bar to release the plates, substantially as and for the purpose set forth.

4. In a magazine photographic camera, the combination of the angle-flange pendent bracket 16, the stationary top piece 18 of the case to which said bracket is secured, the guide-pin or headed rivet that projects from said bracket, the pendent adjustable and spring adjusting center latch 15, against the inwardly-projecting flange 14 of which the lower sensitive plate in the magazine rests until ready to trip, the said pendent latch being provided with an elongated slot that allows of vertical movement of the latch on the headed rivet 19, and the coil-spring 20, that provides a reactionary impulse to said latch, substantially as and for the purpose set forth.

5. In a magazine photographic camera, the combination of the casing of the camera, the brackets 33, secured to the inside of said casing, the radially-adjustable sensitive-plate-carrier frame 30, whose axle-journal rod has bearings in said brackets 33, and the graduated scale 49, on which the pointer of the operating-lever registers, substantially as and for the purpose set forth.

6. In a magazine photographic camera, the combination of the foot flanged rests 35 and the tappet secured to the sensitive-plate-carrier frame, on which the casing of said plate rests, and the locking clutch-hook 60, that holds said plate-casing to the carrier-frame during transition, substantially as and for the purpose set forth.

7. In a magazine photographic camera, the combination of the sensitive-plate-carrier frame, the gangway-plates 53, secured to said frame, the sliding gate 51, that works in said gangway plate, the locking clutch-hook said sliding gate carries, and the spiral spring 54, that provides the reactionary impulse to said sliding gate, substantially as and for the purpose set forth.

8. In a magazine photographic camera, the combination of the sensitive-plate-carrier frame, the elongated pawl 61, that is pivotally secured to said carrier-frame, and whose catch-lug 69 engages in the lock-slot 70 in the sliding gate to lock the same, substantially as and for the purpose set forth.

9. In a magazine photographic camera, the combination of the sensitive-plate-carrier frame, the elongated pawl provided with a catch-lug 69, the sliding gate 51, provided with a lock-slot 70, in which said catch engages to lock said sliding gate, and the strap-spring 65, that impresses said pawl to lock said sliding gate, substantially as and for the purpose set forth.

10. In a magazine photographic camera, the combination of the camera-case, sensitive-plate-carrier frame pivotally suspended at one end of and radially adjustable toward and from the top in the case of the camera, the operating-lever 36 outside said case, and its coadjutary lever 41 within the case, by which said carrier-frame is actuated, substantially as and for the purpose set forth.

11. In a magazine photographic camera, the combination of the sensitive-plate-carrier frame having a pivotal radial movement, the parallel bracket-bar 44, secured to said frame, providing a guideway between said bar and frame, the operating-lever 36, the coadjutary lever 41, and the traveler-pin 42, that projects from said coadjutary lever and travels in said guideway to effect the radial movement of said plate-carrier frame, substantially as and for the purpose set forth.

12. In a magazine photographic camera, the combination of the sensitive-plate-carrier frame, the sliding gate 51, that operates on said frame, the locking clutch-hook 60, the pendent fork-limb 72 from said sliding gate, provided with the foot 73, the operating-lever 36, the coadjutary lever 41, and the traveler-pin 80, that projects from said coadjutary lever, and is arranged when elevated in contact with the foot of the pendent limb 72 to elevate the sliding gate, and when depressed against the curved back of the pawl 61 to throw said pawl out of locking engagement with said sliding gate to allow its reactionary slide under the impulse of the spiral spring 54, substantially as and for the purpose set forth.

13. In a magazine photographic camera, the combination of the camera-case that is arranged to inclose the camera proper, a negative-plate-depository well or basement chamber beneath said camera proper and a magazine depository-chamber for the initial storage of the sensitive plates previous to the negative impression thereon, the said magazine surmounting the camera proper, the said camera-case being provided with a rear removable shutter 2, that rests when closed on foot-brackets 35, the spiral push-spring 82 on the front of said shutter, the stationary lintel 46, that surmounts the rear shutter, the button 84, that has a pivotal attachment to said lintel and fastens the rear shutter when closed, the removable cover 3 over the magazine, and the stationary top piece 18, adjoining said cover, from which top piece the spring center latch hangs pendent, substantially as and for the purpose set forth.

14. In a magazine photographic camera, the combination of the camera-case, the sensitive-plate-carrier frame pivotally hung in said case, in which is provided for it an adjustable radial movement, the releasing-lever 74 outside the camera-case, its coadjutary lever 75 inside said case, the lifting-pin 80, and the journal-pin fast to said releasing-lever and said coadjutary lever, said journal-pin having loose bearing in the lintel 46, that surmounts the rear shutter of the camera, the said releasing-lever being arranged to elevate the locking clutch-hook 60 and release the sensitive plate after the negative is taken, ready for precipitation of said plate by the push-spring 82 into the final depository-chamber for the negative plates below the camera proper, substantially as and for the purpose set forth.

FRANK H. D. SCHWARZ.

In presence of—
E. S. KNIGHT,
THOMAS KNIGHT.